United States Patent [19]

Kibblewhite

[11] Patent Number: 5,029,480
[45] Date of Patent: Jul. 9, 1991

[54] ULTRASONIC LOAD INDICATING MEMBER

[75] Inventor: Ian E. Kibblewhite, Ambler, Pa.

[73] Assignee: SPS Technologies, Inc., Newtown, Pa.

[21] Appl. No.: 475,057

[22] Filed: Feb. 5, 1990

[51] Int. Cl.⁵ ............................................. F16B 31/02
[52] U.S. Cl. ................................... 73/761; 73/862.21
[58] Field of Search ............. 73/761, 862.21, 862.22, 73/862.23, 862.24, 572, 597; 81/467

[56] References Cited

U.S. PATENT DOCUMENTS

| | | | |
|---|---|---|---|
| 3,918,294 | 11/1975 | Makino et al. | 73/761 X |
| 4,294,122 | 10/1981 | Couchman | 73/761 |
| 4,295,377 | 10/1981 | Couchman | 73/761 |
| 4,344,216 | 8/1982 | Finkelston | 29/407 |
| 4,569,229 | 2/1985 | De Halleux | 73/597 |
| 4,601,207 | 7/1986 | Steblay | 73/597 |
| 4,846,001 | 7/1989 | Kibblewhite | 73/761 |

OTHER PUBLICATIONS

Final Report No. AFML-TR-78-138, "Acousto-Elastic Fastener Preload Indicator", by J. C. Couchman.

Primary Examiner—Jerry W. Myracle
Attorney, Agent, or Firm—James D. Dee; Aaron Nerenberg

[57] ABSTRACT

This invention relates to a load indicating member comprising a shank having at least one groove and an ultrasonic transducer coupled to a load indicating member so that an ultrasonic wave is directed to the groove. A surface can be formed adjacent to one longitudinal end of the shank and the ultrasonic transducer can be coupled to this surface. Further, the ultrasonic transducer can be coupled to this surface so that the ultrasonic wave is also directed to the other longitudinal end of the shank which is remote from the surface. The groove may be located on the shank at a predetermined distance from the surface for identification of the member. Moreover, the surface can have a recess, with the ultrasonic transducer being located in the recess. Advantageously, the groove can be an annular groove or the groove can be comprised of threads disposed on the shank. Also, the shank can have two or more annular grooves. These grooves can be located on the shank at a predetermined distance apart for identification of the load indicating member. Preferably, the ultrasonic transducer is a piezoelectric film transducer. Additionally, the preferred load indicating member is a fastener in accordance with the present invention.

36 Claims, 9 Drawing Sheets

ULTRASONIC LOAD INDICATING MEMBER

BACKGROUND OF THE INVENTION

1. Field of the Invention

This invention relates to load indicating members and, more particularly, to load indicating members, such as fasteners, having ultrasonic transducers.

2. Description of the Prior Art

In many operations, it is desirable to determine the amount of longitudinal load experienced by a longitudinally stressed member. This information is particularly useful when the longitudinally stressed member is a fastener since the measurement of the longitudinal stress provides a verification of the existence of a proper joint.

Many prior art techniques have been developed to indicate the amount of longitudinal stress experienced by a fastener by providing a load indicating feature to the fastener itself. This is usually done by interconnecting one end of an elongated member, such as a pin, to a portion of the fastener prior to the installation of the fastener. While each of the various pin-type load indicating members, and load measuring devices known in the art provides its own advantages in terms of accuracy, ease of manufacture, or ease of reading, they are still expensive to manufacture, since they each require extensive modifications and the addition of a centrally located pin-member to the load indicating member. As a result, such load indicating members are only selectively used in practice, either where there is a specific immediate diagnostic need or where there is a serious recognized safety hazard involved. These members are simply too expensive for routine use in assemblies which may only occasionally benefit from such monitoring.

An alternative approach to measuring the elongation of a member or fastener is to use an ultrasonic measurement device. Typically, this is done by removeably interconnecting an ultrasonic transducer to one end of the member being measured, usually to the head of a fastener. In order to obtain a reliable indication, the head of the bolt must be ground extremely flat and a reliable ultrasonic transmission media must be applied to the head of the bolt. The transducer must be properly positioned on the bolt and held in position while the measurements are being taken. Various examples of techniques and apparatuses using this method are known in the art. Furthermore, the prior art teachings include the notion of combining the measuring device with a tightening tool so that the information gained from measuring the elongation of the bolt can be used for determining when to shut off the tightening tool or, alternatively, for monitoring the tightening process to determine whether a proper joint has been formed.

While the above-mentioned methods and apparatuses can provide reliable information about a fastener and a joint, they are in very limited use. This is mainly because the bolt must be carefully manufactured and must be easily accessible to the instrumentation. Thus, ultrasonic tension measurement is recognized as a highly accurate laboratory tightening method for calibration, application testing and for tightening very critical joints. It is replacing strain gage bolts in several calibration and critical quality control applications. However, practical difficulties associated with taking ultrasonic tension measurements have prevented its application as a general assembly tightening strategy. These practical difficulties include: difficulty in maintaining reliable acoustic coupling during tightening; difficulties presented by equipment expense and complexity; and difficulties presented by experimental determination of parameters for each joint.

Suggestions of the prior art for ultrasonic load indicating-type members utilizing a piezoelectric or other ultrasonic sensor include: U.S. Pat. No. 4,294,122, Couchman, which discloses a threaded bolt having an opening in either its head or its opposite end with an ultrasonic transducer fixedly secured therein for use in obtaining preload measurements, as well as other measurements for quality control inspection or for monitoring purposes. Also, U.S. Pat. No. 4,569,229, de Halleux, which discloses a method for measuring strains in a part including the steps of: selecting within a medium one or a plurality of ends of rectilinear measuring runs, which ends are embodied by an inner artificial reflector; emitting a beam of acoustic waves so that acoustic rays carrying sufficient energy strike the useful reflectors; selecting the echoes corresponding to the reflectors; determining by measurement the transit times which are characteristic of the useful acoustic rays up to the inner artificial reflectors and transposing the transit times for each inner reflector considered individually or the respective differences of transit times for each couple of reflectors into an outer strain value or into a strain value within the region delimited by each couple of reflectors. The part for implementing such a method has reflectors consisting particularly of perforations or bores into the part.

Additionally, U.S. Pat. No. 4,601,207, Steblay, discloses a mine roof bolt and a method of measuring the strain in mine roof bolts wherein a flat portion on the head of the mine roof bolt is first machined, and then a hole is drilled radially through the bolt at a predetermined distance from the bolt head. After installation of the mine roof bolt and loading, the strain of the mine roof bolt is measured by generating an ultrasonic pulse at the flat portion. The time of travel of the ultrasonic pulse reflected from the hole is measured. This time of travel is a function of the distance from the flat portion to the hole and increases as the bolt is loaded. Consequently, the time measurement is correlated to the strain in the bolt. Compensation for various factors affecting the travel time are also provided.

Furthermore, U.S. Pat. No. 4,846,001, Kibblewhite, teaches the use of a thin piezoelectric sensor consisting of a piezoelectric film sandwiched between two thin electrodes, which is permanently, mechanically and acoustically coupled to the upper surface of a member and is used to determine the length, tensile load, stress, or other tensile load dependent characteristic of the member by ultrasonic techniques.

SUMMARY OF THE INVENTION

This invention relates to a load indicating member comprising a shank having at least one groove and an ultrasonic transducer means coupled to the load indicating member so that an ultrasonic wave is directed to the groove. A surface can be formed adjacent to one longitudinal end of the shank and the ultrasonic transducer means can be coupled to this surface. Further, the ultrasonic transducer means can be coupled to this surface so that the ultrasonic wave is also directed to the other longitudinal end of the shank which is remote from the surface. The groove may be located on the shank at a predetermined distance from the surface for identification of the member. Moreover, the surface can have a recess, with the ultrasonic transducer means being located in the recess. Advantageously, the groove can be an annular groove or the groove can be comprised of threads disposed on the shank. Also, the shank can have two or more annular grooves. These grooves can be located on the shank at a predetermined distance apart for identification of the load indicating member. Preferably, the ultrasonic transducer means is a piezoelectric film transducer. Additionally, the preferred load indicating member is a fastener in accordance with the present invention.

There are several advantages associated with this invention as compared to prior art ultrasonic load indicating members. These advantages include load calculation since load is calculated from ultrasonic time of flight measurements over a defined portion of the shank of this invention and, therefore, load calculation is not generally affected by joint grip length, bending and variations in stress distribution resulting from bearing and thread engagement surfaces. Also, manufacturing costs of the load indicating member of the present invention can be lower than prior art members since the grooves can be rolled during a thread rolling operation, and an additional operation to face a pointed end of the load indicating member is not required. Furthermore, load indicating member identification coding can be incorporated in the member of the present invention so that no prior knowledge of the member or joint is required to measure load. Moreover, a load specification may not be required in some applications since tightening instrumentation can be utilized to automatically indicate the maximum permitted tensile load for the member.

Additionally, it is possible to measure the load in an already installed member in accordance with the present invention with no prior knowledge of the member or joint since it is possible to control the distance between the grooves. Also, electronic circuit and cabling delays can be eliminated by subtracting the ultrasonic time of flight measurement from a first groove from that of a second groove in accordance with the present invention. Therefore, load measurements can be made independently of ultrasonic pulse/sense electronics and cable lengths. Furthermore, calibration is greatly simplified since only a single scaling factor relating the change in ultrasonic time of flight to tensile load needs to be experimentally determined for any load indicating member in accordance with the present invention.

Accordingly, it is an object of the present invention to provide a load indicating member having a shank with at least one groove and ultrasonic transducer means coupled to the member so that an ultrasonic wave is directed to the groove, thereby allowing accurate load measurements to be obtained. It is a further object of the present invention to provide a load indicating member wherein load measurements are generally not affected by joint grip length, bending and variations in stress distribution resulting from bearing and thread engagement surfaces. It is an additional object of the present invention to provide a load indicating member which can be produced in an inexpensive manner. It is another object of the present invention to provide a load indicating member which provides identification coding so that no prior knowledge of the member or joint is required to measure load. These and other objects and advantages of the present invention will be apparent to those skilled in the art upon reference to the following description of the preferred embodiments.

BRIEF DESCRIPTION OF THE DRAWINGS

In the drawings, wherein like reference numerals refer to like elements throughout.

DETAILED DESCRIPTION OF THE PREFERRED EMBODIMENTS

Figure 1:
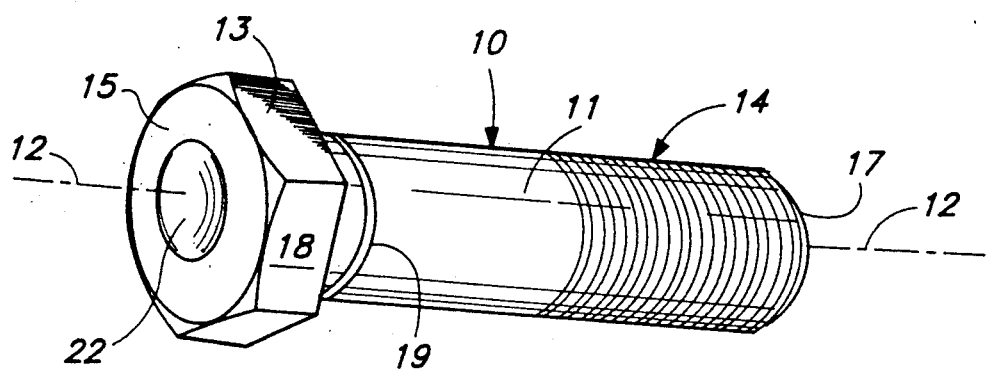
FIG. 1 is a perspective view of an embodiment of a load indicating member having one groove in accordance with the present invention.

The present invention provides for a load indicating member comprising a shank having at least one groove and an ultrasonic transducer means coupled to the load indicating member so that an ultrasonic wave is directed to the groove. The ultrasonic transducer means can be coupled to the load indicating member at any appropriate location on the member provided that the ultrasonic wave, which is generated by the ultrasonic transducer means, is directed to the groove. More than one ultrasonic transducer may be utilized in accordance with the present invention. For example, a first ultrasonic transducer for generating an ultrasonic drive pulse wave can be coupled to the load indicating member so that the drive pulse wave is directed to the groove and a second ultrasonic transducer for receiving echo waves reflected from the groove can be coupled to the member at a different location on the member suitable for receiving the echo waves. However, the use of a single ultrasonic transducer for both generating the drive pulse wave and receiving the echo waves is preferred. Additionally, it is preferred that the ultrasonic transducer means is coupled to a surface formed adjacent to one longitudinal end of the shank. Moreover, the ultrasonic transducer means may be coupled to this surface so that the ultrasonic pulse wave is directed to the other longitudinal end of the shank which is remote from the surface, in addition to being directed to the groove. Furthermore, the groove can be located on the shank at a predetermined distance from this surface, thereby providing a means for identification of the load indicating member. The ultrasonic transducer means may also be located in a recess to protect the transducer means from environmental hazards.

The load indicating member can be formed from a bolt, rod, rivet, stud or other suitable structural element which has been modified to provide an indication of the tensile load, stress, elongation or other characteristics of the element during a tightening operation, as well as at various times during the life of the joint in which the element is installed. Moreover, the load indicating member can be made of metal, plastic or other appropriate material suitable for transmitting ultrasonic waves.

The groove acts as an artificial reflector and provides at least one face for reflecting the ultrasonic wave generated by the ultrasonic transducer means back to the transducer means. Preferably, the groove's wave reflecting face is generally parallel to the part of the load indicating member's surface to which the ultrasonic transducer means is coupled. Advantageously, the groove is an annular groove on the shank, although other appropriate groove configurations on the shank can be utilized in accordance with the present invention. For example, the groove can be a partial groove extending 30°, 60°, 90°, 120°, 180°, etc. around the circumference of the shank. However, generally the smaller the groove, the weaker the resulting signal produced by a reflection of the ultrasonic wave from the groove. Alternatively, the groove can be comprised of threads disposed on the shank. Two or more annular grooves can also be advantageously utilized since these grooves can be located on the shank at a predetermined distance apart for identification of the load indicating member. The groove or grooves can be formed on the shank by conventional rolling or machining operations. Moreover, the groove or grooves can be readily rolled on the load indicating member during a thread rolling operation on the member.

The ultrasonic transducer means can be any appropriate transducer type known in the art which can be manufactured to produce directed ultrasonic waves. For example, small transducer elements or rings can be utilized. The transducer can be either permanently attached to the shank or it can be temporarily coupled to the load indicating member providing the transducer is capable of directing an ultrasonic wave to the groove and a suitable acoustic coupling medium is provided. Advantageously, the ultrasonic transducer means is a piezoelectric film transducer.

The load indicating member of the present invention may be used with a tightening tool, including a conventional power tool, which engages the load indicating member both electrically and mechanically, as can be appreciated by those skilled in the art. Furthermore, an electronic control device may be electrically interconnected with the ultrasonic transducer by techniques well-known in the art. The electronic control device supplies and measures electronic signals of the ultrasonic transducer such as to provide an ultrasonic measurement of the tensile load, stress or elongation of the shank of the load indicating member. Also, the electronic control device can be used to automatically identify the type or size of load indicating member since the predetermined distance between grooves on the shank provides a means of identification in accordance with the present invention.

It will be appreciated by those skilled in the art that the tightening tool may be provided with a display device for displaying ultrasonic measurement of the tensile load, stress, elongation or member identification obtained during operation. Alternatively, the tightening tool may be adapted to use the information continuously supplied by the electronic control device to determine when a predetermined amount of tensile load or elongation has occurred and, therefore, when a tightening operation should be stopped. It will be further appreciated by those skilled in the art that the power tool chosen may, in a manner well-known in the art, monitor other characteristics of a joint being formed, such as the torque and the instantaneous angle of the load indicating member. An example of such a power tool may be found in U.S. Pat. No. 4,344,216, Finkelston, issued Aug. 17, 1982. This other information available from the power tool may be combined with the tensile load, stress, elongation or member identification information supplied by the electronic control device to provide a precisely controlled tightening operation wherein the various measured parameters are used directly to control the tightening sequence or to monitor the results of the tightening operation.

An example of an apparatus that may be used with the present invention for measurement of the time of flight of ultrasonic waves along the member is described in U.S. Pat. No. 4,846,001, Kibblewhite, issued July 11, 1989, the entire disclosure of which is accordingly incorporated by reference herein. Many different electronic techniques for the measurement of time of flight are well-known in the art as a result of ultrasonic developments in the field of non-destructive testing. Most of the techniques are capable of providing the required resolution and accuracy. However, some of the techniques offer particular advantages in terms of the number of pulses for accurate measurement, circuit complexity and power consumption. The load indicating member of the present invention is preferably utilized with pulse-echo techniques, but other techniques known in the art, such as resonant techniques, can also be utilized.

A clear understanding of the present invention can be had by reference to the accompanying drawings. Although specific forms of the invention have been selected for illustration in the drawings themselves, the descriptions thereof are not intended to limit the scope of the present invention.

Figure 2:
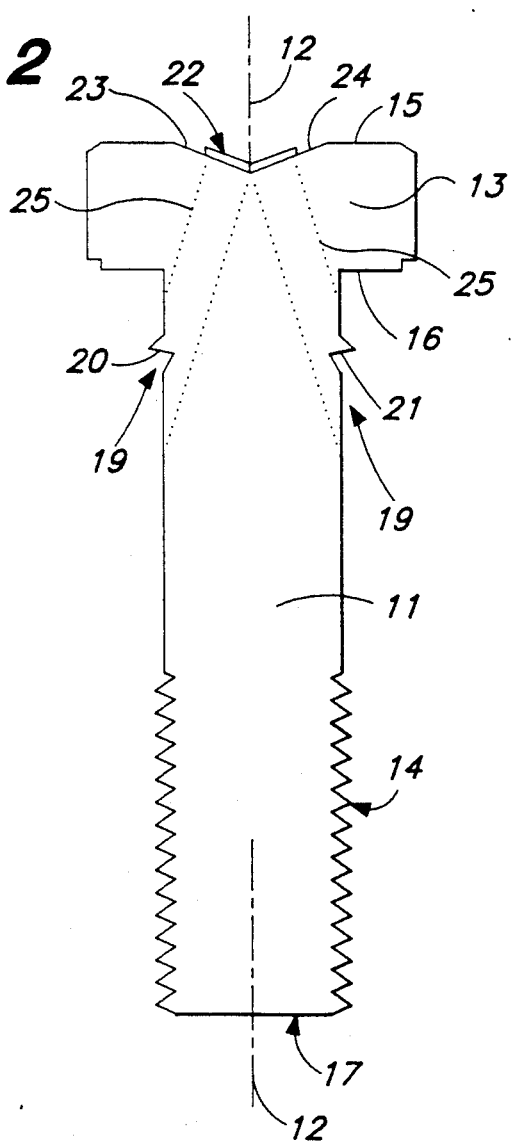
FIG. 2 is a sectional view illustrating the load indicating member of FIG. 1.

FIGS. 1 and 2 illustrate one preferred embodiment of a load indicating member and, more particularly, a fastener 10 adapted for measuring strain in the fastener 10. The fastener 10 in this preferred embodiment is a bolt comprised of a shank 11 having a longitudinal axis 12 and a predetermined longitudinal length. The shank 11 is adapted to be subjected to longitudinal strain along the longitudinal axis 12. A head 13 is formed on one longitudinal end of the shank 11 and threads 14 are formed at the other longitudinal end. The head 13 has an end surface 15 formed on the end portion of the head 13, and a shoulder 16 is formed between the head 13 and the shank 11. A lower surface 17 is formed at the opposite end of the shank 11. The head 13 is also provided with a wrenching or tool engagement surface 18, such as a hexagonal wrenching surface, disposed about the periphery thereof. An annular groove 19 is formed on the unthreaded part of the shank 11. Furthermore, the annular groove 19, which can be rolled on the fastener during the thread rolling operation, is formed to provide faces 20 and 21, as illustrated in FIG. 2's sectional view, for reflecting an ultrasonic wave to a piezoelectric film transducer 22 and also for minimizing undesirable reflections. Of course, faces 20 and 21 illustrated in FIG. 2's sectional view may constitute a single face of a three-dimensional fastener. The annular groove 19 can also be formed so that the ultimate tensile and fatigue strength of the fastener 10 is not reduced.

The piezoelectric film transducer 22 is coupled with the head end surface 15 so that an ultrasonic wave is directed towards the annular groove 19. Moreover, the piezoelectric film transducer 22 is permanently, mechanically, and electrically interconnected with the head end surface 15. Alternatively, the piezoelectric film transducer 22 may be semi-permanently mounted on the head end surface 15 or temporarily coupled to the head end surface 15, such as during tightening of the fastener 10, provided that the transducer 22 is coupled to the head end surface 15 so that the ultrasonic waves are directed to the annular groove 19 and that a suitable acoustic coupling medium is provided, as will be appreciated by those skilled in the art. Advantageously, the piezoelectric film transducer 22 is comprised of a thin layer of copolymer piezoelectric film bonded to a thin layer of soft aluminum foil. In a preferred embodiment, the transducer 22 is comprised of an approximately 10 micron layer of VF2/VF3 copolymer piezoelectric film directly bonded to an approximately 50 micron layer of soft aluminum foil, which is adhered to the head end surface 15 as illustrated in FIGS. 1 and 2. The thin transducer 22 takes the shape of the head end surface 15, comprised of faces 23 and 24 in FIG. 2's sectional view, when pressure is applied during the adhering manufacturing operation. Preferably, groove faces 20 and 21 are generally parallel to head end surface faces 23 and 24 respectively.

Strain in the fastener 10 is measured by the ultrasonic measurement technique. This technique involves the initial generation of an ultrasonic signal from the transducer 22 adhered to head end surface faces 23 and 24, which directs the signal towards groove faces 20 and 21 respectively. The signal travels from the transducer 22 through the body of the fastener 10 to groove faces 20 and 21. The signal is then reflected from the groove faces 20 and 21 back to the transducer 22 at least once. A representation of the directed ultrasonic signal path 25 is depicted in FIG. 2. Ultrasonic electronic instrumentation (not illustrated) is attached to the fastener 10 and electrically interconnected with the transducer 22 to supply and measure the initial and return signals to provide ultrasonic time of flight measurements from the transducer 22 to the groove faces 20 and 21. The difference in ultrasonic time of flight measurements from the transducer 22 to groove faces 20 and 21 provides a time of flight measurement which is proportional to fastener load since the fastener 10 elongates and the speed of the ultrasonic wave reduces with stress resulting from the induced axial load during tightening.

Figure 3:
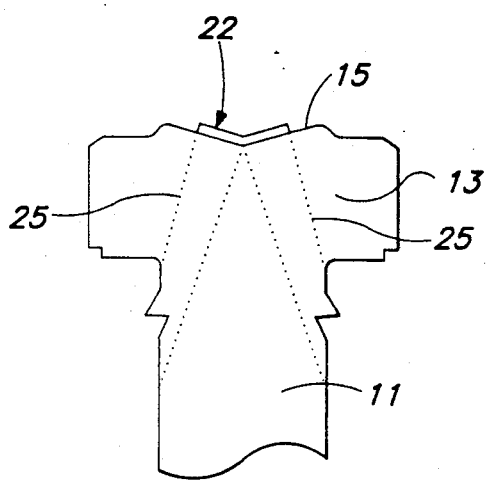
FIGS. 3 through 6 are partial sectional views illustrating alternate examples of load indicating members having one groove in accordance with the present invention.
Figure 4:
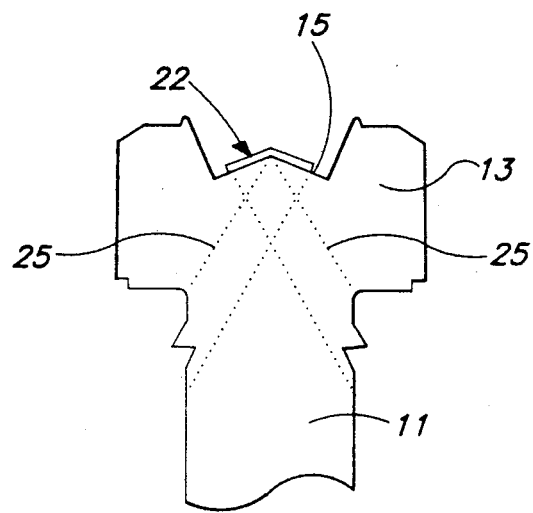
Figure 5:
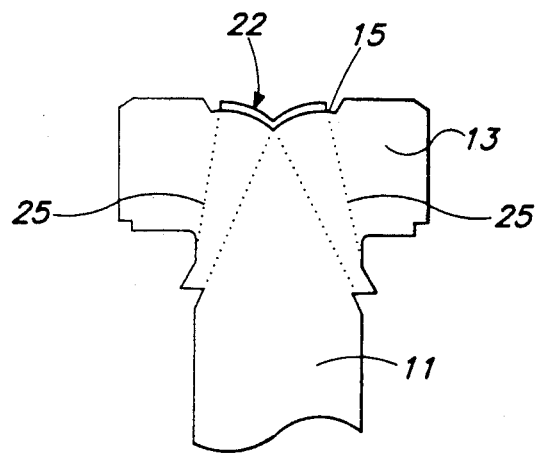
Figure 6:
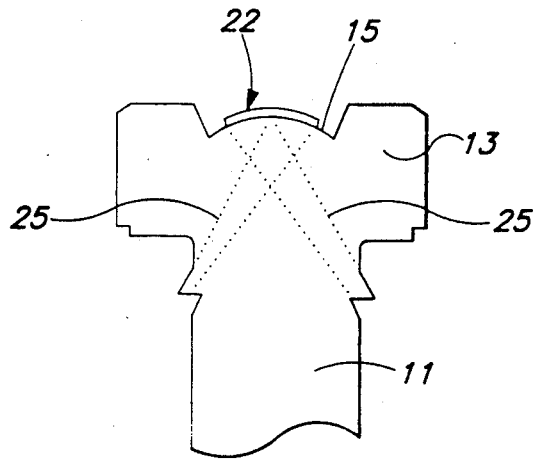

There are many different possible embodiments of the present invention, including the embodiments illustrated in the sectional views of FIGS. 3 through 6. The embodiments illustrated therein have one annular groove. The head end surface 15 to which the transducer 22 is coupled, is conically shaped and in axial alignment with the shank 11. More particularly, FIG. 3 illustrates a concave-conical type head configuration, and FIG. 4 illustrates a convex-conical type head configuration. Furthermore, the head end surface 15 can be located in a recess formed in the head 13 as illustrated in FIGS. 5 and 6. The head end surface 15 can have a radiused contour in axial alignment with the shank 11, as is also illustrated in FIGS. 5 and 6. More particularly, FIG. 5 illustrates a concave-conical-radiused type head configuration, and FIG. 6 illustrates a convex-conical-radiused type head configuration. Other head configurations can be utilized in accordance with the present invention, as will be appreciated by those skilled in the art.

Figure 7:
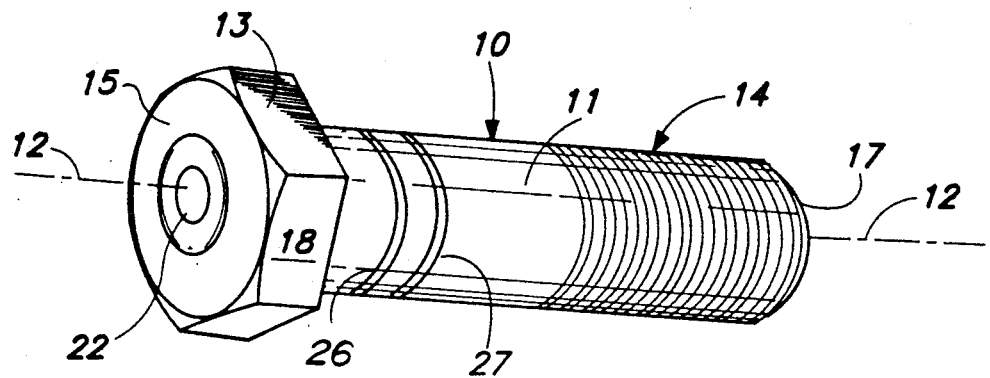
FIG. 7 is a perspective view of an embodiment of a load indicating member having two grooves in accordance with the present invention.
Figure 8:
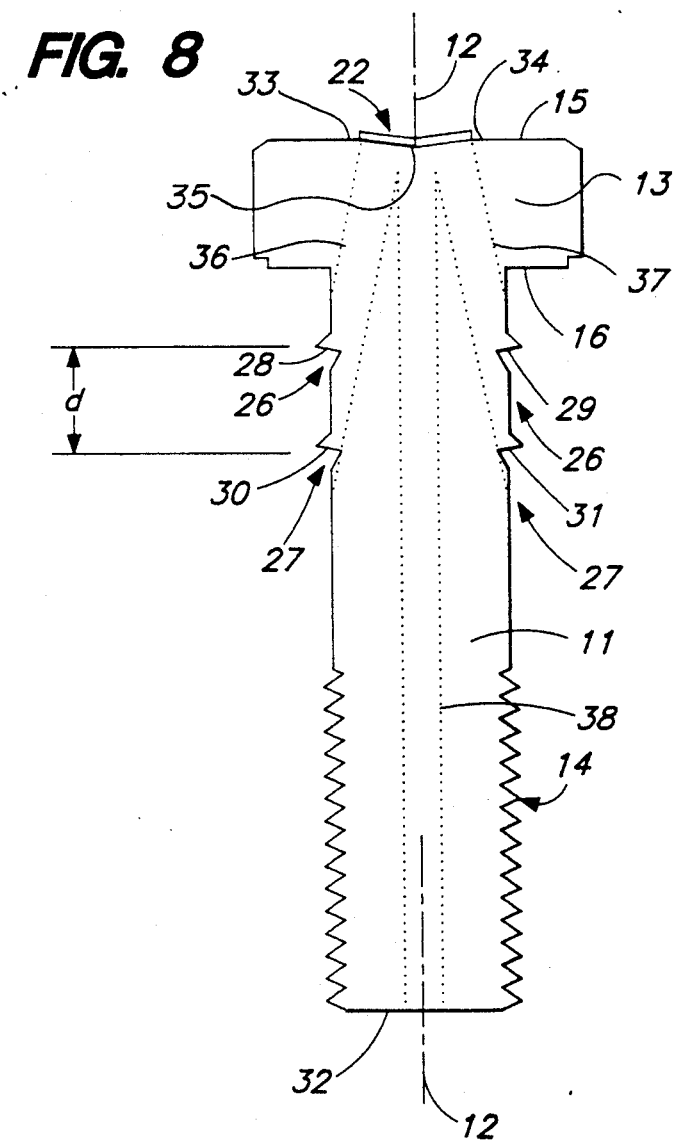
FIG. 8 is a sectional view illustrating the load indicating member of FIG. 7.

FIGS. 7 and 8 illustrate another preferred embodiment of the present invention wherein the fastener 10 has two annular grooves 26 and 27 located on the shank 11 between the head 13 and the threads 14. The annular grooves 26 and 27 provide references for measurement of strain in the fastener 10 using the ultrasonic measurement technique described above. Furthermore, the first annular groove 26 is formed to provide faces 28 and 29, and the second annular groove 27 is formed to provide faces 30 and 31, as illustrated in FIG. 8's sectional view, for reflecting the ultrasonic wave to the piezoelectric film transducer 22, which is permanently, mechanically, and electrically interconnected with the head end surface 15. Of course, faces 28 and 29, and faces 30 and 31 illustrated in FIG. 8's sectional view may constitute single faces of annular grooves 26 and 27 respectively for a three-dimensional fastener.

In the embodiment illustrated in FIGS. 7 and 8, the piezoelectric film transducer 22 is coupled with the head end surface 15 so that an ultrasonic wave is directed towards first annular groove 26, second annular groove 27, and the longitudinal end face 32 of the shank 11. The longitudinal end face 32 is remote from the head end surface 15 and provides a reference for measurement of length of the fastener using the ultrasonic measurement technique. More particularly, the head end surface 15 is comprised of: a first face 33, which is generally parallel to annular groove faces 28 and 30; a second face 34, which is generally parallel to annular groove faces 29 and 31; and a third face 35, which is generally parallel to the longitudinal end face 32 of the shank 11. The ultrasonic wave signal travels from the part of the transducer 22 coupled to first face 33 through the body of the fastener 10 to first groove face 28 and second groove face 30, as depicted by the representation of the directed ultrasonic signal path 36 in FIG. 8. The ultrasonic wave signal also travels from the part of the transducer 22 coupled to second face 34 through the body of the fastener 10 to first groove face 29 and second groove face 31, as depicted by the representation of the directed ultrasonic signal path 37 in FIG. 8. Additionally, the ultrasonic wave signal travels from the part of the transducer 22 coupled to third face 35 through the body of the fastener 10 to the longitudinal end face 32, as depicted by the representation of the directed ultrasonic signal path 38 in FIG. 8. The ultrasonic wave signal is then reflected back to transducer 22 from all the aforesaid faces. The ultrasonic time of flight measurement from the transducer 22 to the longitudinal end face 32 is used for fastener length and non-destructive testing of the fastener. However, this measurement is not required for the computation of load.

First annular groove 26 and second annular groove 27 are located on the shank 11 at a predetermined distance apart for identification of the fastener 10 using the ultrasonic measurement technique. For example, as illustrated in FIG. 8, the distance d between first groove face 28 and second groove face 30 can be controlled accurately during manufacturing of the grooves since the annular groove profiles can be grounded on the same die. Therefore, this distance d can be varied slightly for different fasteners allowing the initial ultrasonic time of flight difference measurement to provide a means of identifying the fastener. Ultrasonic instrumentation used with the fastener can scale the change in this time of flight difference measurement during tightening to provide an indication of load in the fastener. If the annular grooves can be manufactured with sufficient precision, the load in an already installed fastener may be measured without the requirement for a zero load time of flight measurement utilized in the prior art.

Accordingly, a means of coding fastener identification using the distance d between these annular grooves can be used with the present invention. Additionally, a tightening controller can also be utilized with this invention for automatically identifying the fastener from the coding means, as well as computing and displaying or controlling on load measurements derived from the ultrasonic time of flight from the transducer to the annular grooves.

Figure 9:
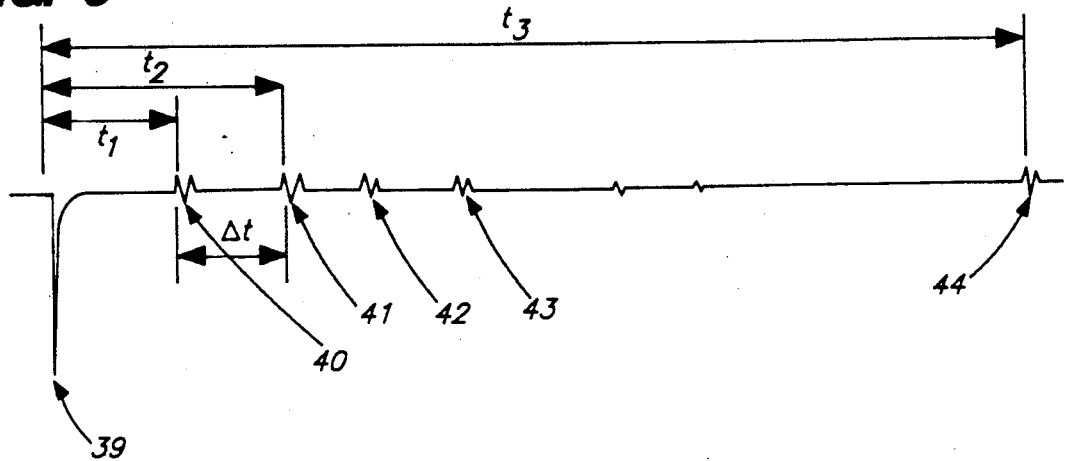
FIG. 9 is a graphical representation illustrating ultrasonic pulse and echo signals produced by the load indicating member of FIG. 7.

FIG. 9 is a graphical representation illustrating an example of ultrasonic pulse and echo signals produced by the embodiment of FIGS. 7 and 8. Each time the transducer is pulsed, an ultrasonic drive pulse signal is generated by the transducer. The drive pulse signal 39 travels through the fastener and reflects from a face of the first annular groove 26 to produce a first echo 40 from the first annular groove 26, and then reflects from a face of the second annular groove 27 to produce a first echo 41 from the second annular groove 27. This signal continues to travel back and forth a number of times until the signal is attenuated or damped out. The second echo 42 from the first annular groove 26 and the second echo 43 from the second annular groove 27 are also shown in FIG. 9. Additionally, the signal travels to the longitudinal end face 32 of the fastener to produce a first echo 44 from the end of the fastener.

The position of the grooves is chosen to avoid coincidence of second and third echoes from grooves closer to the transducer with first echoes from grooves further from the transducer. The first and second echoes are measured and the time of flight difference between the signals is determined. A time of flight measurement that can be used for fastener identification and load calculations is $\Delta t = t_2 - t_1$ wherein: $\Delta t$ is the time difference between the first echo 40 from the first groove 26 and the first echo 41 from the second groove 27, $t_2$ is the time difference between the initial drive pulse signal 39 and the first echo 41 from the second groove 27, and $t_1$ is the time difference between the initial drive pulse signal 39 and the first echo 40 from the first groove 26. $t_1$ and $t_2$ can also be measured using two pulses instead of the same pulse provided no significant change in load condition occurs during the period between pulses.

Figure 10:
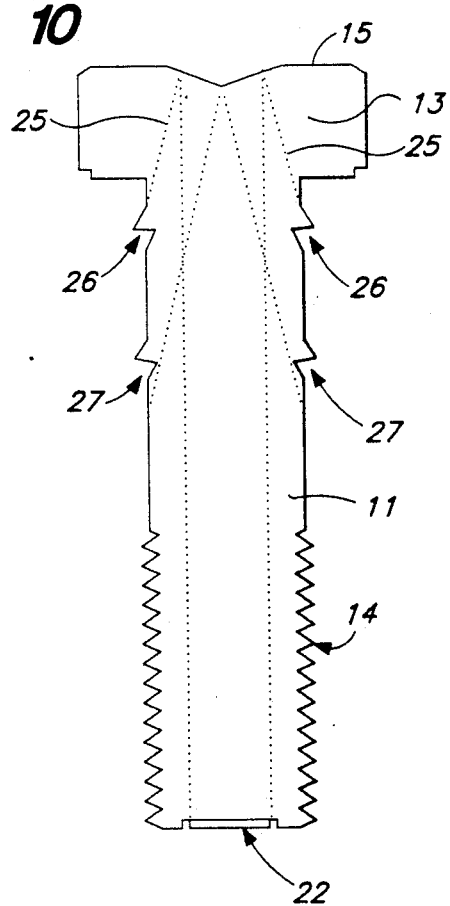
FIG. 10 is a sectional view illustrating an embodiment of a load indicating member having a transducer on the end of the member opposite the head in accordance with the present invention.

Other fastener configurations in accordance with the present invention in which the grooves direct the wave to another reflective surface instead of directly back to the transducer are also possible. For example, FIG. 10 is a sectional view illustrating an embodiment of a fastener having the transducer 22 on the end of the fastener opposite the head. A representation of the directed ultrasonic signal path 25 is depicted in FIG. 10. This type of configuration may be used where the only accessible end of the fastener is threaded, such as studs or some connecting rod fasteners, or where the permanently or temporarily attached transducer can only be fixed to a flat surface or direct an ultrasonic wave in the axial direction.

As noted above, one or more annular grooves can be used as ultrasonic wave or artificial reflectors. Nevertheless, one groove fails to eliminate electronic circuit delays inherent in the difference measurement with two grooves. Pulse and echo signals from one groove can provide fastener identification information since the groove can be selectively located anywhere on the shank. However, two grooves can provide more accurate fastener identification information. Furthermore, more than two grooves may improve fastener fatigue strength by improving the resilience of the joint.

Figure 11:
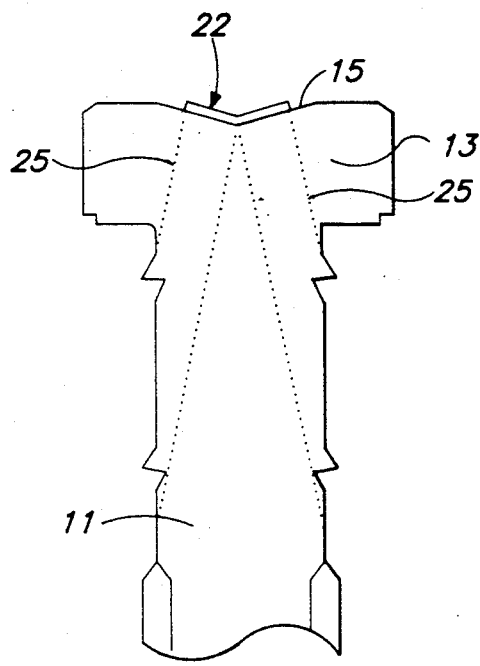
FIGS. 11 through 24 are partial sectional views illustrating alternate examples of load indicating members having two grooves in accordance with the present invention.
Figure 12:
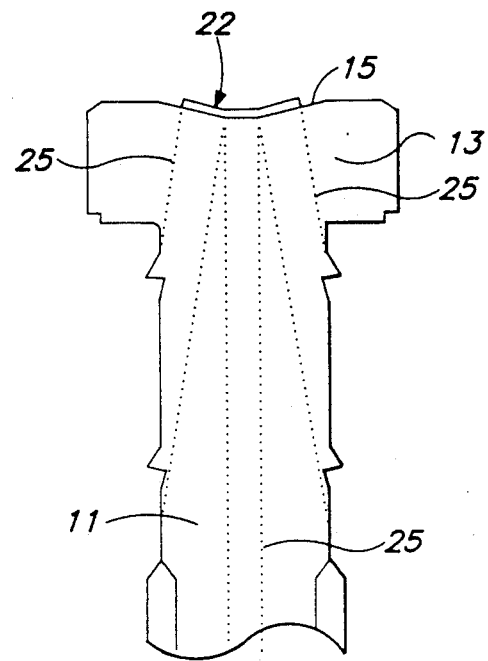
Figure 13:
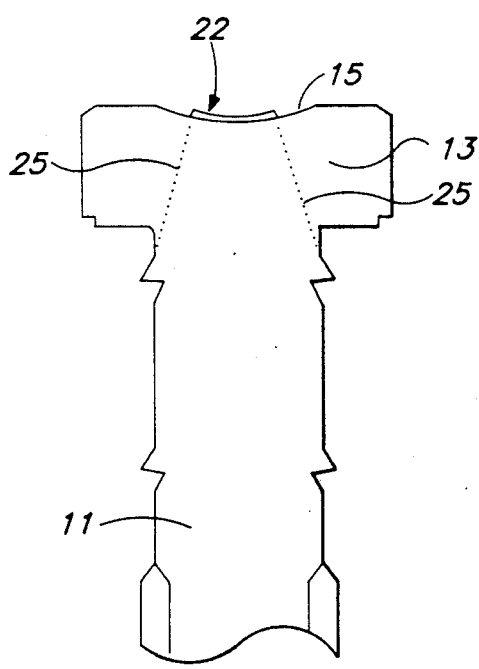
Figure 14:
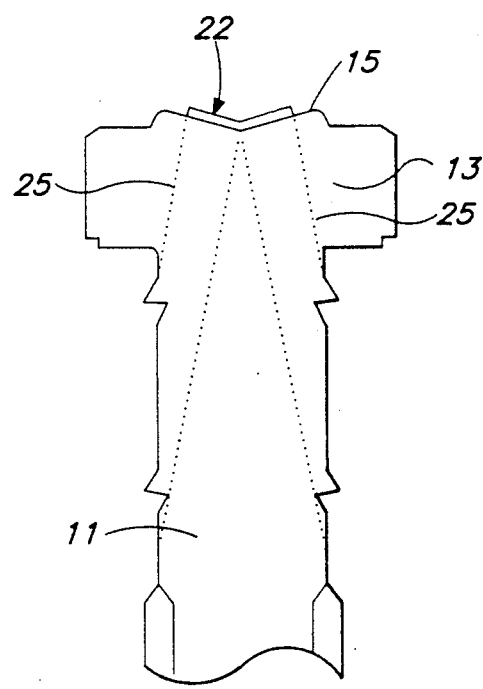
Figure 15:
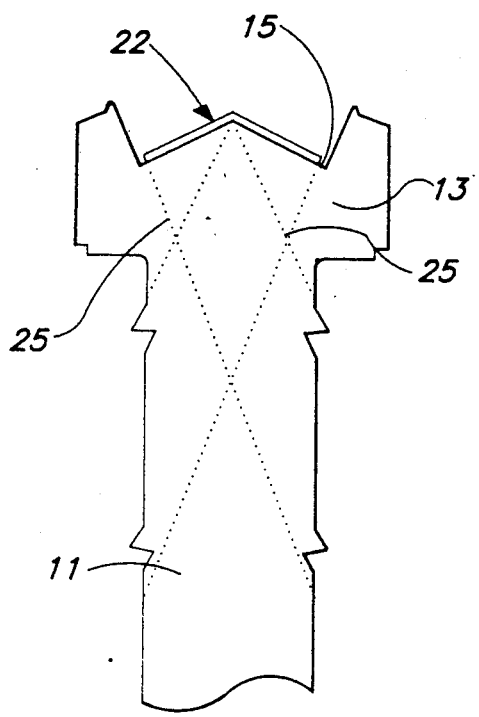
Figure 16:
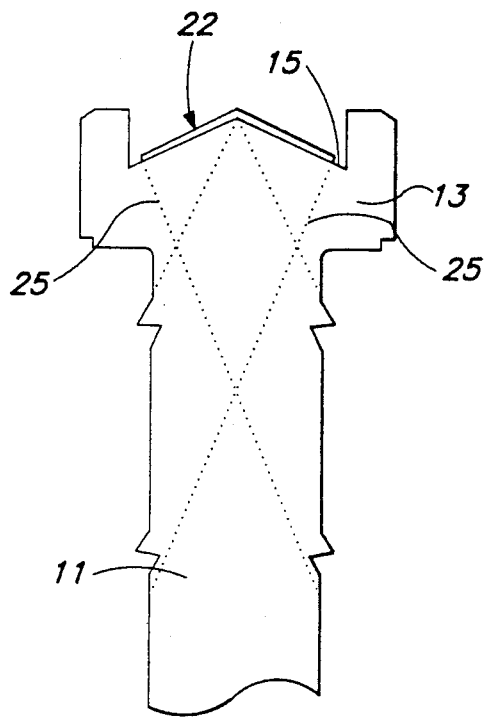
Figure 17:
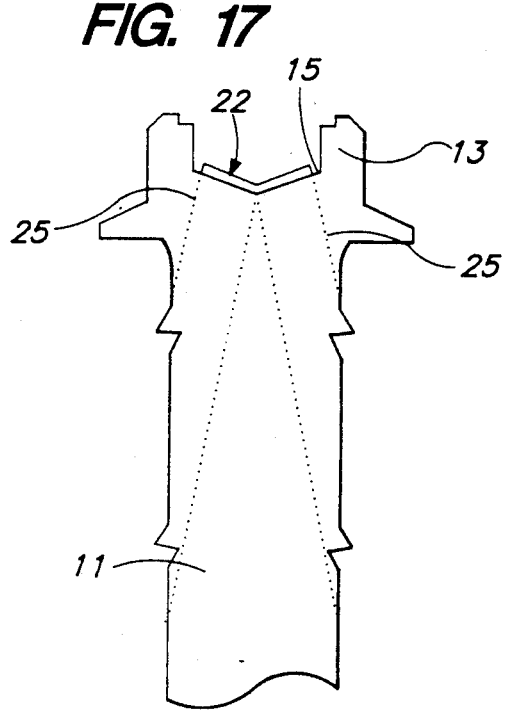
Figure 18:
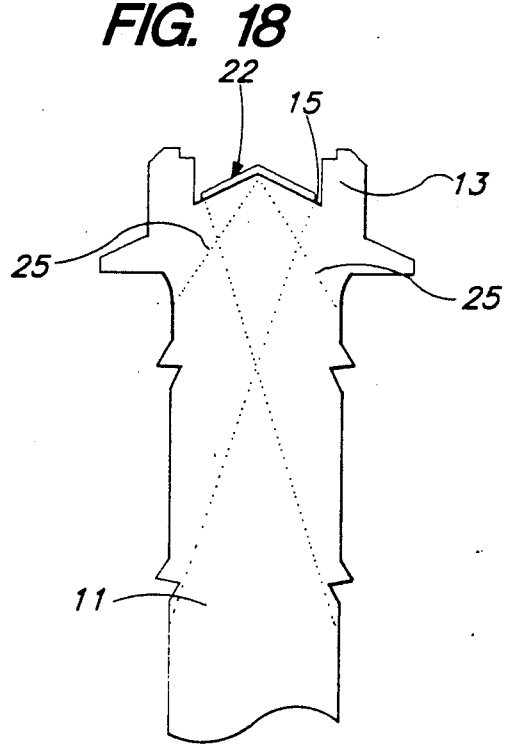
Figure 19:
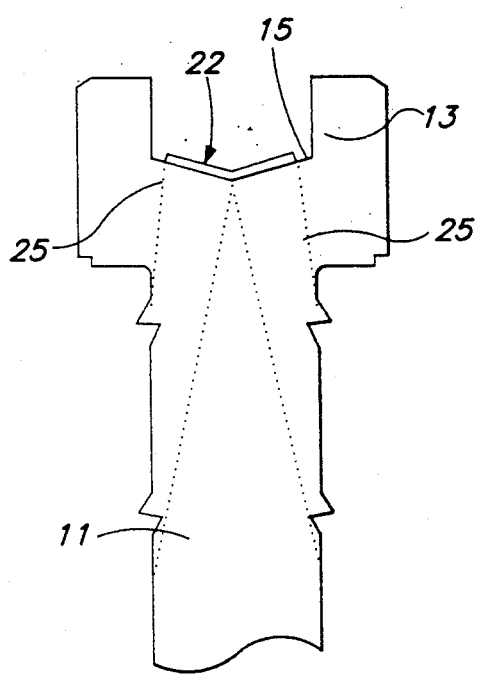
Figure 20:
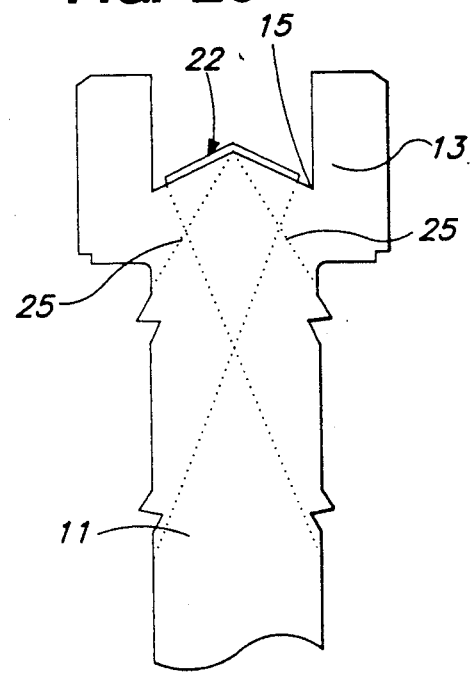
Figure 21:
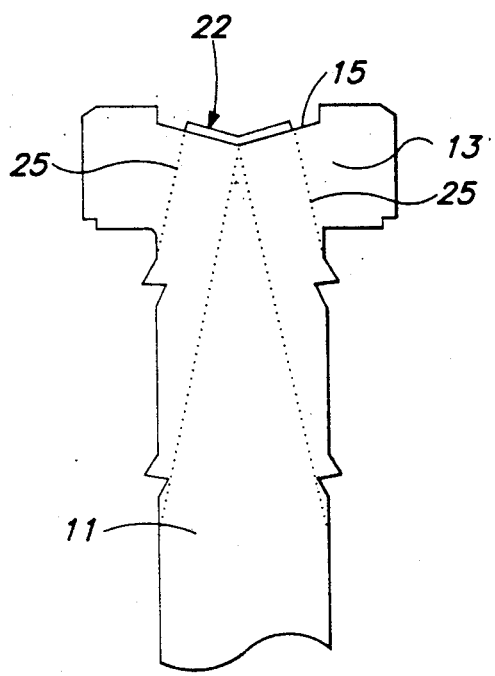
Figure 22:
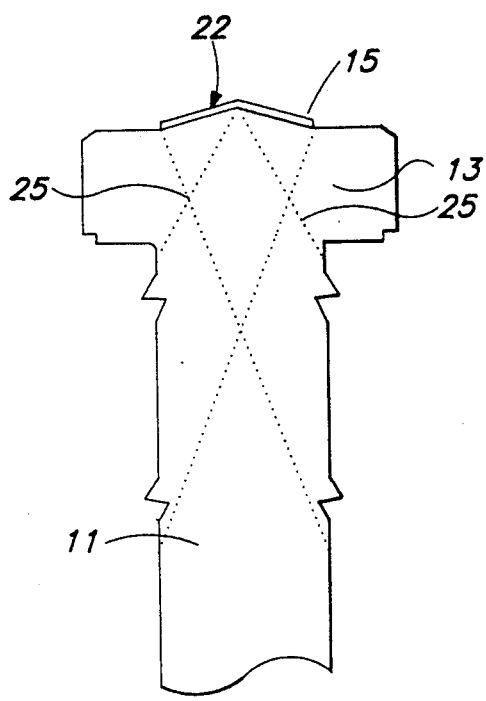
Figure 23:
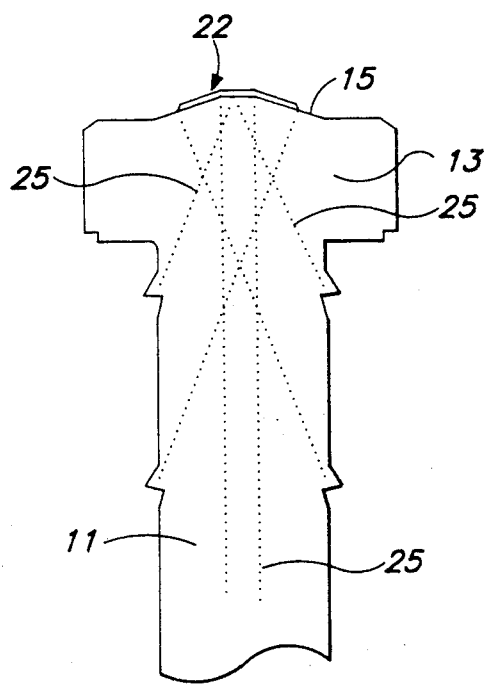
Figure 24:
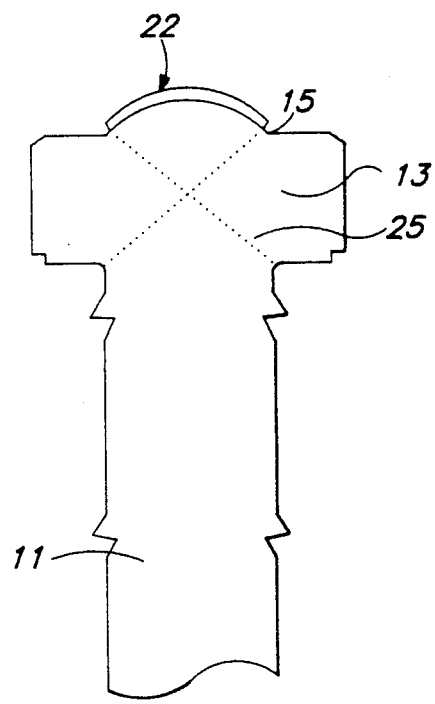

Additional embodiments of the present invention having two annular grooves are illustrated in the partial sectional views of FIGS. 11 through 24. Representations of the directed ultrasonic signal path 25 are depicted therein. More particularly, FIG. 11 illustrates a concave-conical type head configuration, and FIG. 12 illustrates a concave-conical type head configuration with a flat center surface. FIG. 13 illustrates a concave-spherical type head configuration. FIG. 14 illustrates a concave-conical type head configuration with no recess in the head 13. FIG. 15 illustrates a convex-conical type head configuration with no recess in the head 13. Moreover, FIGS. 16, 18, and 20 illustrate different embodiments of convex-conical type head configurations with the transducer 22 in a recess in the head 13. Also, FIGS. 17, 19, and 21 illustrate different embodiments of concave-conical type head configurations with the transducer 22 in a recess in the head 13. FIG. 22 illustrates a convex-conical type head configuration without any recess in the head 13. FIG. 23 illustrates a convex-conical type head configuration with a flat center surface. Furthermore, FIG. 24 illustrates a convex-spherical type head configuration without any recess in the head 13.

Figure 25:
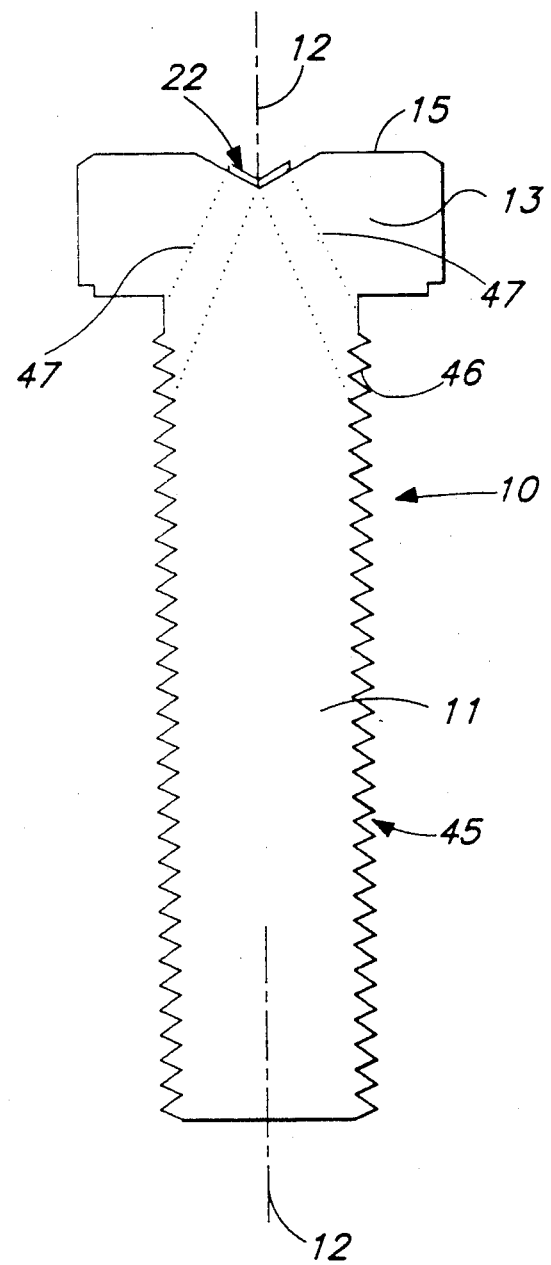
FIG. 25 is a sectional view illustrating an embodiment of a load indicating member having threads in accordance with the present invention.

FIG. 25 illustrates another embodiment of the present invention. The fastener 10 in this embodiment is comprised of a shank 11 having a longitudinal axis 12 and a predetermined longitudinal length. The shank 11 is adapted to be subjected to longitudinal strain along the longitudinal axis 12. The head 13 is formed on one longitudinal end of the shank 11, and the head 13 has an end surface 15 formed on the end portion of the head 13. Further, threads 45 are formed on the shank 11, and at least one of the threads 45 has a face 46 for reflecting the ultrasonic wave to the piezoelectric film transducer 22. However, more than one thread can have the face for reflecting the wave to the transducer 22. Preferably, these thread faces are generally parallel to the part of the head end surface 15 to which the transducer 22 is coupled. For example, the portion of the head end surface 15 to which the transducer 22 is coupled can be helically shaped following the thread helix in order that a major portion of the surface 15 is generally parallel to the reflecting face 46 of the threads 45. More particularly, the head end surface 15 forms a helical cone in axial alignment with the shank 11 with the pitch of the surface 15 being generally equal to the pitch of the threads 45.

Figure 26:
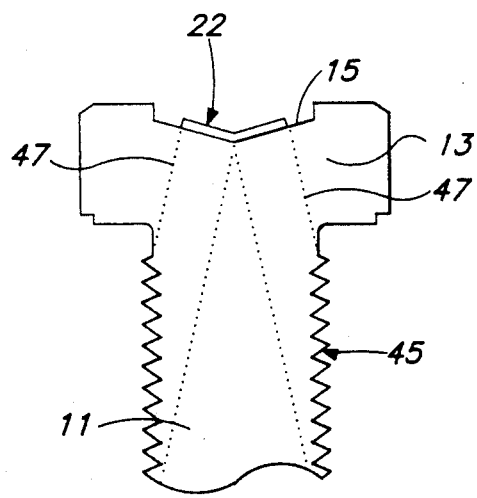
FIGS. 26 and 27 are partial sectional views illustrating alternate examples of load indicating members having threads in accordance with the present invention.
Figure 27:
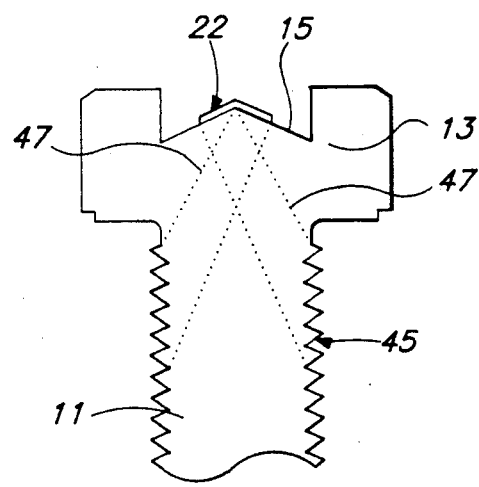

Furthermore, the transducer 22 is coupled with the head end surface 15 so that the ultrasonic wave is directed towards the threads 45. The representation of the directed ultrasonic signal path 47 is depicted in FIG. 25. Moreover, other fastener configurations are possible. For example, the transducer 22 can be located in a recess, the head can be conically shaped and in axial alignment with the shank, or the head can have a radiused contour in axial alignment with the shank. Other embodiments are illustrated in FIG. 26, which shows a concave-conical helix type head configuration, and FIG. 27, which shows a convex-conical helix type head configuration, with threads as the artificial reflectors in accordance with the present invention.

The present invention also encompasses a method of measuring strain in a load indicating member of the type comprised of a shank having at least one groove and an ultrasonic transducer means coupled to the load indicating member so that the ultrasonic wave is directed to the groove. The method comprises generating the ultrasonic signal from the ultrasonic transducer means so that the signal travels through the load indicating member to the groove and reflects back to the ultrasonic transducer means at least once, thereby providing measurements indicative of strain on the load indicating member. As noted above, the transducer can be coupled to one longitudinal end of the shank so that the ultrasonic signal is also reflected from the other longitudinal end of the shank. Also, the shank can have two or more annular grooves for reflecting the ultrasonic waves. As also noted above, the annular grooves can be located on the shank at a predetermined distance apart, thereby providing measurements for identification of the load indicating member. Furthermore, the groove can be comprised of threads disposed on the shank.

Accordingly, the present invention provides several advantages over prior art ultrasonic load indicating members. These advantages include load calculation utilizing the present invention since load is calculated from ultrasonic time of flight measurements over a defined portion of the shank of the fastener and, therefore, load calculation is not generally affected by joint grip length, bending and variations in stress distribution resulting from bearing and thread engagement surfaces. Also, manufacturing costs of the fastener of the present invention can be lower than prior art fasteners since the grooves can be rolled during a thread rolling operation, and an additional operation to face a pointed end of the fastener is not required. Furthermore, fastener identification coding can be incorporated in the fastener of the present invention so that no prior knowledge of the fastener or joint is required to measure fastener load. Moreover, a load specification may not be required in some applications since tightening instrumentation can be utilized to automatically indicate the maximum permitted tensile load for the fastener (e.g. 95% minimum proof load).

Additionally, it is possible to measure the load in an already installed fastener in accordance with the present invention with no prior knowledge of the fastener or joint since it is possible to control the distance between the grooves. Also, electronic circuit and cabling delays can be eliminated by subtracting the ultrasonic time of flight measurement of the first groove from that of the second groove in accordance with the present invention. Therefore, load measurements can be made independently of ultrasonic pulse/sense electronics and cable lengths. Furthermore, fastener calibration is greatly simplified since only a single scaling factor relating the change of ultrasonic time of flight ($t_2 - t_1$) to tensile load must be experimentally determined for any fastener design in accordance with the present invention.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

I claim:

1. A load indicating member comprising:
   a shank having a least one external groove; and
   ultrasonic transducer means coupled to said load indicating member so that an ultrasonic wave is directed to said groove;
   said external groove acting as an artificial reflector by providing at least one face for reflecting the ultrasonic wave generated by said ultrasonic transducer means back to said ultrasonic transducer means.

2. The load indicating member of claim 1 wherein a surface is formed adjacent to one longitudinal end of said shank and said ultrasonic transducer means is coupled to said surface.

3. The load indicating member of claim 2 wherein said ultrasonic transducer means is coupled to said surface so that the ultrasonic wave is also directed to the other longitudinal end of said shank which is remote from said surface.

4. The load indicating member of claim 2 wherein said groove is located on said shank at a predetermined distance from said surface for identification of said load indicating member.

5. The load indicating member of claim 2 wherein said surface has a recess, said ultrasonic transducer means being located in said recess.

6. The load indicating member of claim 1 wherein said groove is comprised of threads disposed on said shank.

7. The load indicating member of claim 1 wherein said ultrasonic transducer means is a piezoelectric film transducer.

8. The load indicating member of claim 1 wherein said load indicating member is a bolt, rod, rivet or stud.

9. A fastener adapted for measuring strain in the fastener, said fastener comprising:
   a shank having a longitudinal axis and a predetermined longitudinal length, said shank being adapted to be subjected to longitudinal strain along said longitudinal axis;
   a head formed on one longitudinal-end of said shank, said head having a surface formed on the end portion of said head;
   at least one annular groove formed on said shank, said groove having at least one face for reflecting an ultrasonic wave to a piezoelectric film transducer means;
   said piezoelectric film transducer means being coupled with said end surface of said head so that an ultrasonic wave is directed towards said annular groove.

10. The fastener of claim 9 wherein said piezoelectric film transducer means is permanently, mechanically, and electrically interconnected with said end surface of said head.

11. The fastener of claim 9 wherein said piezoelectric film transducer means comprises a thin layer of copolymer piezoelectric film bonded to a thin layer of soft aluminum foil.

12. The fastener of claim 9 further comprising a recess formed in said head, said end surface of said head being located in said recess.

13. The fastener of claim 9 wherein said end surface of said head is conically shaped and in axial alignment with said shank.

14. The fastener of claim 9 wherein said end surface of said head has a radiused contour in axial alignment with said shank.

15. The fastener of claim 9 wherein said strain is measured by an ultrasonic measurement technique comprising the generation of an ultrasonic signal from said piezoelectric film transducer means whereby said signal travels from said piezoelectric film transducer means through said fastener to said annular groove and back to said piezoelectric film transducer means at least once.

16. The fastener of claim 15 wherein said fastener is a bolt having threads disposed on said shank remote from said head.

17. The fastener of claim 16 wherein two annular grooves are located on said shank between said head and said threads, said annular grooves providing references for measurement of strain in the fastener using the ultrasonic measurement technique.

18. The fastener of claim 17 wherein said piezoelectric film transducer means is permanently, mechanically, and electrically interconnected with said end surface of said head so that an ultrasonic wave is also directed towards the other longitudinal end of said shank which is remote from said surface, said other longitudinal end of said shank providing a reference for measurement of length of the fastener using the ultrasonic measurement technique.

19. The fastener of claim 17 wherein said two annular grooves are located on said shank at a predetermined distance apart for identification of said fastener using the ultrasonic measurement technique.

20. A fastener adapted for measuring strain in the fastener, said fastener comprising:
a shank having a longitudinal axis and a predetermined longitudinal length, said shank being adapted to be subjected to longitudinal strain along said longitudinal axis;
a head formed on one longitudinal end of said shank, said head having a surface formed on the end portion of said head;
threads formed on said shank, wherein at least one of said threads has a face for reflecting an ultrasonic wave to a piezoelectric film transducer means;
said piezoelectric film transducer means being coupled with said end surface of said head, said thread face being generally parallel to a portion of said end surface of said head to which said transducer means is coupled to that an ultrasonic wave is directed towards said thread face and the ultrasonic wave is reflected back to said transducer means.

21. The fastener of claim 20 wherein said piezoelectric film transducer means is permanently, mechanically, and electrically interconnected with said end surface of said head.

22. The fastener of claim 20 wherein said piezoelectric film transducer means comprises a thin layer of copolymer piezoelectric film bonded to a thin layer of soft aluminum foil.

23. The fastener of claim 20 further comprising a recess formed in said head, said piezoelectric film transducer means being located in said recess.

24. The fastener of claim 20 wherein said end surface of said head has a radiused contour in axial alignment with said shank.

25. The fastener of claim 20 wherein said strain is measured by an ultrasonic measurement technique comprising the generation of an ultrasonic signal from said piezoelectric film transducer means whereby said signal travels from said piezoelectric film transducer means through said fastener to said threads and back to said piezoelectric film transducer means at least once.

26. The fastener of claim 25 wherein said threads are located on said shank providing references for measurement of strain in the fastener using the ultrasonic measurement technique.

27. The fastener of claim 26 wherein said piezoelectric film transducer means is permanently, mechanically, and electrically interconnected with said end surface of said head so that an ultrasonic wave is also directed towards the other longitudinal end of said shank which is remote from said surface, said other longitudinal end of said shank providing a reference for measurement of length of the fastener using the ultrasonic measurement technique.

28. The fastener of claim 26 wherein said threads are located on said shank at a predetermined distance from said head for identification of said fastener using the ultrasonic measurement technique.

29. A method of measuring strain in a load indicating member of the type comprised of a shank having at least one groove and an ultrasonic transducer means coupled to said load indicating member so that an ultrasonic wave is directed to said groove, said method comprising generating an ultrasonic signal from said ultrasonic transducer means so that said signal travels through said load indicating member to said groove and reflects back to said ultrasonic transducer means at least once, thereby providing measurements indicative of strain on said load indicating member.

30. The method of claim 29 wherein said ultrasonic transducer means is coupled to one longitudinal end of said shank so that said ultrasonic signal is also reflected from the other longitudinal end of said shank.

31. The method of claim 29 wherein said shank has two or more annular grooves for reflecting ultrasonic waves, said annular grooves being located on said shank at a predetermined distance apart, thereby providing measurements for identification of said load indicating member.

32. The method of claim 29 wherein said groove is comprised of threads disposed on said shank.

33. A load indicating member comprising:
a shank having at least one annular groove; and
ultrasonic transducer means coupled to said load indicating member so that an ultrasonic wave is directed to said groove.

34. The load indicating member of claim 33 wherein said shank has two or more annular grooves.

35. The load indicating member of claim 34 wherein said annular grooves are located on said shank at a predetermined distance apart for identification of said load indicating member.

36. A fastener adapted for measuring strain in the fastener, said fastener comprising:
a shank having a longitudinal axis and a predetermined longitudinal length, said shank being adapted to be subjected to longitudinal strain along said longitudinal axis;
a head formed on one longitudinal end of said shank, said head having a surface formed on the end portion of said head;

threads formed on said shank, wherein at least one of said threads has a face for reflecting an ultrasonic wave to a piezoelectric film transducer means;

said piezoelectric film transducer means being coupled with said end surface of said head so that an ultrasonic wave is directed towards said threads;

wherein said end surface of said head forms a helical cone in axial alignment with said shank wherein the pitch of said end surface is equal to the pitch of said threads.

* * * * *